United States Patent Office 3,464,954
Patented Sept. 2, 1969

3,464,954
STABILIZED POLYOLEFIN COMPOSITIONS
Clarence E. Tholstrup, Kingsport, Tenn., assignor to Eastman Kodak Company, Rochester, N.Y., a corporation of New Jersey
No Drawing. Application Jan. 4, 1960, Ser. No. 54.
Divided and this application Apr. 5, 1968, Ser. No. 719,226
Int. Cl. C08f 45/58
U.S. Cl. 260—45.85                3 Claims

ABSTRACT OF THE DISCLOSURE

Polyolefins containing a stabilizer combination comprising a dialkyl ester of thiodipropionic acid and a substituted phenol.

---

This application is a division of application Ser. No. 54, filed Jan. 4, 1960, now abandoned.

This invention relates to new poly-α-olefin compositions. Preferred embodiments of the invention relate to polyethylene and polypropylene compositions having improved stability at elevated temperatures to oxidative degradation.

Poly-α-olefins such as polyethylene, polypropylene and the like are commonly subjected to elevated temperatures in the course of their processing into useful items of commerce. Such processing methods as rolling, injection molding, extrusion and the like at elevated temperatures usually result in oxidative degradation of the polymer. In addition, many uses of poly-α-olefins, such as in electrical insulation and the like, often times expose the poly-α-olefin to elevated temperatures. To minimize oxidative deterioration in poly-α-olefins, antioxidants or stabilizers are often times incorporated therein.

It is an object of this invention to provide new poly-α-olefin compositions having improved resistance to thermal degradation.

It is another object of this invention to provide new synergistic combinations of stabilizers for poly-α-olefin compositions.

It is also an object of this invention to provide novel polyethylene and polypropylene compositions containing synergistic combinations of compounds that improve the stability of polyethylene and polypropylene compositions against deterioration resulting from exposure to elevated temperatures.

Other objects of the invention will be apparent from the description and claims that follow.

The present invention comprises poly-α-olefin compositions having incorporated therein a stabilizer combination of a diester of 3,3'-thiodipropionic acid and certain substituted phenols.

The diesters of 3,3'-thiodipropionic acid comprising the present stabilizer combination have the following formula $$S(CH_2CH_2COOR)_2$$

wherein R is an alkyl radical having at least 4 and generally 4 to 20 carbon atoms, with 8 to 18 carbon atoms being preferred. A particularly effective ester has twelve carbon atoms for the R substituent, namely, dilauryl-3,3'-thiodipropionate. However, any diester of 3,3'-thiodipropionic acid as described above can be employed in the present stabilizer combination including the butyl, amyl, hexyl, heptyl, octyl, nonyl, decyl, tridecyl, myristyl, pentadecyl, cetyl, heptadecyl, stearyl and eicosyl diesters of 3,3'-thiodipropionic acid, or mixture thereof.

A wide variety of substituted phenols can be effectively utilized in combination with the described diesters of 3,3'-thiodipropionic acid including those having the following general formulas:

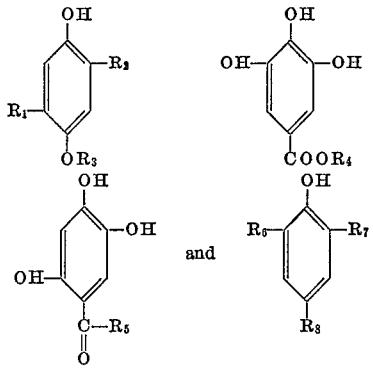

and

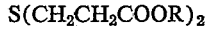

In the above substituted phenol formulas: $R_3$, $R_4$ and $R_5$ are alkyl radicals desirably having 1 to 18 carbon atoms and preferably 1 to 12 carbon atoms; $R_1$, $R_2$, $R_6$, $R_7$ and $R_8$ are alkyl radicals desirably having 1 to 18 carbon atoms and preferably 1 to 12 carbon atoms, hydrogen atoms, or cyclic hydrocarbon radicals desirably having 6 carbon atoms in the cyclic nucleus and preferably 1-alkylcyclohexyl radicals or 1-alkylbenzyl radicals with the alkyl radical having desirably 1 to 18 and preferably 1 to 12 carbon atoms, and wherein at least one of $R_1$ and $R_2$ is other than a hydrogen atom and at least two of $R_6$, $R_7$ and $R_8$ are other than hydrogen atoms. The substituent $R_2$ and at least one of $R_6$ and $R_7$ is preferably a tertiary alkyl radical having 4 to 8 carbon atoms, a 1-methylbenzyl radical or a 1-methylcyclohexyl radical.

Typical substituted phenols comprising the stabilizer combination of the invention include:

2-tert.-butyl-4-methoxyphenol,
3-tert.-butyl-4-methoxyphenol,
3-tert.-octyl-4-methoxyphenol,
2-methyl-4-methoxyphenol,
2-stearyl-4-n-butoxyphenol,
3-tert.-butyl-4-stearyloxyphenol,
3-tert.-octyl-4-methoxyphenol,
3-lauryl-4-ethoxyphenol,
2,5-di-tert.-butyl-4-methoxyphenol,
2-methyl-4-methoxyphenol,
2-(1-methylcyclohexyl)-4-methoxyphenol,
2-tert.-butyl-4-dodecyloxyphenol,
2-(1-methylbenzyl)-4-methoxyphenol,
2-tert.-octyl-4-methoxyphenol,
methyl gallate,
n-propyl gallate,
n-butylgallate,
lauryl gallate,
myristyl gallate,
stearylgallate,
2,4,5-trihydroxyacetophenone,
2,4,5-trihydroxy-n-butyrophenone,
2,4,5-trihydroxystearophenone,
2,6-ditert.-butyl-4-methylphenol,
2,6-ditert.-octyl-4-methylphenol,
2,6-ditert.-butyl-4-stearylphenol, 2-methyl-4-methyl-6-tert.-butylphenol,
2,6-distearyl-4-methylphenol,
2,6-dilauryl-4-methylphenol,
2,6-di(1-methylbenzyl)-4-methylphenol,
2,6-di(1-methylcyclohexyl)-4-methylphenol,
2-(1-methylcyclohexyl)-4-methylphenol,
2-(1-methylbenzyl)-4-methylphenol, and related substituted phenols.

The combination of the described diesters of 3,3'-thiodipropionic acid and the substituted phenols can be used to stabilize a wide variety of solid poly-α-olefin compositions against deterioration resulting from exposure to elevated temperatures. Any of the normally solid polymers of α-monoolefinic aliphatic hydrocarbons containing 2 to 10 carbon atoms can be stabilized in accordance with the invention. The subject stabilizer combinations are preferably used in polyethylene and polypropylene, especially polypropylene, although such poly-α-olefins as poly(3-methylbutene-1), poly(4-methylpentene-1), poly-(pentene-1), poly(3,3-dimethylbutene-1), poly(4,4-dimethylbutene-1), poly(octene-1), poly(decene-1) and the like can also be stabilized with the subject stabilizer combinations. Both the so-called "low density" and "high density" or high crystallinity poly-α-olefin compositions can be stabilized in accordance with the invention. Reference is made to Faxcett et al. U.S. Patent No. 2,153,553 granted Apr. 11, 1939, and to copending applications Coover U.S. Ser. No. 559,536 filed Jan. 17, 1956 and Coover et al. U.S. Ser. No. 724,904 filed Mar. 31, 1958, with regard to the preparation of various poly-α-olefin compositions that can be stabilized against thermal degradation in accordance with the invention. The additive stabilizer combinations of the invention are especially useful for stabilizing the solid resinous poly-α-olefins having average molecular weights of at least 15,000 and more usually at least 20,000 although the stabilizer combinations of the invention can also be utilized to stabilize the so-called poly-α-olefin waxes having lower average molecular weights of usually 3,000 to 12,000.

The amount of the combination of the diester of 3,3'-thiodipropionic acid and the substituted phenol employed in poly-α-olefin compositions in accordance with the invention can be widely varied, the stabilizing amount of this combination usually varying with the particular use to which the poly-α-olefin compositions are to be put. Concentrations of at least about .001% of each stabilizer component are suitable, although about .001% to 5% for each stabilizer component are generally used, with about 0.1% to 3% of the diester of 3,3'-thiodipropionic acid and about .01% to 1% of the substituted phenol being preferred, the concentration being based on the weight of the poly-α-olefin. We generally utilize the combination of the subject stabilizers at a weight ratio of the diester of 3,3'-thiodipropionic acid to the substituted phenol in the range of 1/100 to 100/1, and preferably 1/50 to 50/1.

The stabilizer combination of the invention can be incorporated or blended to poly-α-olefin compositions by the conventional methods utilized for blending such materials into resins or plastics. Typical of such methods that can be suitably employed include milling on heated rolls, deposition from solvents, and dry blending. The stabilizers of the invention can be incorporated separately or together into the poly-α-olefin compositions.

The stabilizer combinations of the present invention lend to poly-α-olefin compositions improved stability, and more particularly, improved stability against oxidative deterioration resulting from exposure to elevated temperatures. In addition, poly-α-olefin compositions containing the stabilizer combinations of the invention have enhanced stability against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses. Poly-α-olefins stabilized as described can be cast, extruded, rolled or molded into sheets, rods, tubes, pipes, filaments and other shaped articles, including the widely used films of the polymers about .5 to 100 mils in thickness. The present compositions can be used for coating paper, wire, metal foil, glass fiber fabrics, synthetic and natural textiles or fabrics, and other such materials.

The subject stabilizer combinations of dialkyl esters of 3,3'-thiodipropionic acid and substituted phenols are synergistic combinations, namely, the stabilizing effect of such combinations in poly-α-olefins is substantially greater than the additive effect of the individual stabilizers of the combination.

The invention is further illustrated by the following examples. In the following examples the stability of the poly-α-olefins was determined by an oven storage test. The poly-α-olefin under investigation is compression molded into a smooth sheet or plate. The plate is then cut into pieces weighing about 0.25 g. each. The 0.25 g. samples of the molded polymer are then placed in an air oven at 160° C. Samples are removed at intervals and each sample analyzed for peroxides. The oven storage life is the time required for initial peroxide formation in a sample of the polymer. To determine peroxide formation in the oven exposed samples, each 0.25 g. sample in question is dissolved or suspended in 20 ml. of carbon tetrachloride and allowed to digest for 25 minutes. To this is added 20 ml. of a mixture consisting of 60% glacial acetic acid and 40% chloroform, and then 1.0 ml. of a saturated aqueous solution of potassium iodide. The resulting mixture is allowed to react for two minutes, 100 ml. of water is added to dilute the mixture, and then a starch indicator is added. The resulting mixture is then back-titrated with 0.002 N sodium thiosulfate. The peroxide concentration, P, in milliequivalents per kilogram of polymer is given by the expression, $P=8S$, where $S$ is the number of milliliters of 0.002 N sodium thiosulfate used.

EXAMPLE 1

Several samples of powdered polypropylene were mixed with dialkyl-3,3'-thiodipionates and substituted phenols of the invention, compression molded into plates 1/16 mil in thickness, and the resulting molded samples evaluated with respect to stability by the 160° C. oven storage test described above. The polypropylene was a plastic grade solid polypropylene having an average molecular weight greater than 15,000, a density of about .91, and an inherent viscosity of about 1.25 as determined in tetralin at 145° C. The results of the stability evaluations are summarized by the data set out in Table A below. Samples of the individual components of the various stabilizer combinations in the polypropylene, as well as the polypropylene with no additive, were included in the stability tests for comparative purposes. The concentrations of additive in Table A are based on the weight of the polypropylene. In Table A: "DLTDP" is dilauryl-3,3'-thiodipropionate, "DSTDP" is distearyl-3,3'-thiodipropionate, and "BHA" is a commercial mixture of 2-tert.-butyl-4-methoxyphenol and 3-tert.-butyl-4-methoxyphenol.

TABLE A

| Additive: | Oven life at 160° C., hours |
|---|---|
| None | 2 |
| 0.3% DLTDP | 3 |
| 0.3% DSTDP | 3 |
| 0.1% BHA | 5 |
| 0.1% 2-tert.-butyl-4-dodecyloxyphenol | 6 |
| 0.1% 2-tert.-octyl-4-methoxyphenol | 4 |
| 0.3% DLTDP+0.1% 2-tert.-butyl-4-dodecyloxyphenol | 18 |
| 0.3% DLTDP+0.1% 2-tert.-octyl-4-methoxyphenol | 15 |
| 0.3% DLTDP+0.1% BHA | 15 |
| 0.3% DSTDP+0.1% BHA | 12 |

As can be observed from the data set out in Table A, combinations of the substituted phenols and the dialkyl-3,3'-thiodipropionates are synergistic combinations, the stabilizing effect of such combinations being substantially more than the additive stabilizing effect of the components of such combinations. Similar synergism is demonstrated if plastic grade polyethylene having an average molecular weight greater than 15,000, a density of about .91 and a melt index of 7.59 is substituted for the polypropylene or if 0.1% 2,5-ditert.-butyl-4-methoxyphenol is substituted for one of the phenols, in the described stability evaluations.

EXAMPLE 2

Stabilizer combinations of the invention were evaluated by the method described in Example 1 in the stabilization of plastic grade solid polyethylene having an average molecular weight greater than 15,000, a density of about .91 and a melt index of about 7.59, as well as in the stabilization of plastic grade solid polypropylene having an average molecular weight greater than 15,000, a density of about .91 and an inherent viscosity of about 1.25 as determined in tetralin at 145° C. The results of the stability tests are summarized by the data set out in Table B below. The concentrations of additive in Table B are based on the weight of the poly-α-olefin. In Table B, "DLTDP" is dilauryl-3,3'-thiodipropionate.

TABLE B

| Additive | Oven life at 160° C., hours | |
|---|---|---|
| | Polyethylene | Polypropylene |
| None | 2 | 2 |
| 0.05% DLTDP | 7 | |
| 0.3% DLTDP | | 3 |
| 0.05% n-propyl gallate | 7 | 5 |
| 0.025% n-propyl gallate | | 5 |
| 0.05% lauryl gallate | | 12 |
| 0.3% DLTDP+0.025% n-propyl gallate | | 11 |
| 0.3% DLTDP+0.05% n-propyl gallate | | 13 |
| 0.05% DLTDP+0.05% n-propyl gallate | 17 | |
| 0.3% DLTDP+0.05% lauryl gallate | | 22 |

The stabilizing effect of the above combination of substituted phenols and dilauryl-3,3'-thiodipropionate is demonstrated to be a synergistic effect by the data in Table B. Similar synergism is demonstrated if distearyl-3,3'-thiodipropionate is substituted for the dilauryl-3,3'-thiodipropionate.

EXAMPLE 3

Stabilizer combinations of dilauryl-3,3'-thiodipropionate and 2,4,5-trihydroxy-n-butyrophenone in the polyethylene and polypropylene described in Example 2 were evaluated by the method described in Example 1. For purposes of comparison, 3,3'-thiodipropionic acid was tested in combination with 2,4,5-trihydroxy-n-butyrophenone. The results of the stability tests are summarized by the data set out in Table C below. The concentrations of additive in Table C are based on the weight of the poly-α-olefin. In Table B, "DLTDP" is dilauryl-3,3'-thiodipropionate, "TDPA" is 3,3'-thiodipropionic acid and "THBP" is 2,4,5-trihydroxy-n-butyrophenone.

TABLE C

| Additive | Oven life at 160° C., hours | |
|---|---|---|
| | Polyethylene | Polypropylene |
| None | 2 | 2 |
| 0.05% DLTDP | 7 | |
| 0.3% DLTDP | | 3 |
| 0.1% TDPA | | 2 |
| 0.05% THBP | 7 | 12 |
| 0.1% THBP | | 15 |
| 0.2% THBP | | 20 |
| 0.5% THBP | | 30 |
| 0.05% DLTDP+0.05% THBP | 17 | |
| 0.3% DLTDP+0.05% THBP | | 45 |
| 0.3% DLTDP+0.1% THBP | | 60 |
| 0.3% DLTDP+0.2% THBP | | >80 |
| 0.3% DLTDP+0.5% THBP | | >100 |
| 0.1% TDPA+0.05% THBP | | 14 |

As can be observed from the data set out in Table C, combinations of dilauryl-3,3'-thiodipropionate and 2,4,5-trihydroxy-n-butyrophenone are synergistic stabilizer combinations in polyethylene and polypropylene. Similar synergism results if 2,4,5-trihydroxyacetophenone or 2,4,5-trihydroxystearophenone is substituted for the 2,4,5-trihydroxy - n - butyrophenone, or if distearyl - 3,3'-thiodipropionate is substituted for the dilauryl-3,3'-thiodipropionate. The closely related combination of 3,3'-thiodipropionic acid and 2,4,5-trihydroxy-n-butyrophenone, the last combination of Table C, was not a synergistic combination.

EXAMPLE 4

Stabilizer combinations of dilauryl-3,3'-thiodipropionate and other substituted phenols of the invention in the polypropylene described in Example 1 were evaluated by the method described in Example 1. The results of the stability tests are summarized by the data set out in Table D below. The concentrations of additive in Table D are based on the weight of the polypropylene. In Table D, "DLTDP" is dilauryl-3,3'-thiodipropionate and "BHT" is 2,6-di-tert.-butyl-4-methyl-phenol.

TABLE D

| Additive: | Oven life at 160° C., hours |
|---|---|
| None | 2 |
| 0.3% DLTDP | 3 |
| 0.5% DLTDP | 4 |
| 0.1% BHT | 4 |
| 0.1% BHT+0.3% DLTDP | 15 |
| 0.1% BHT+0.5% DLTDP | 18 |
| 0.1% 2-(1-methylbenzyl)-4-methylphenol | 5 |
| 0.1% 2-(1-methylbenzyl)-4-methylphenol +0.3% DLTDP | 14 |

Similar synergism of the stabilizer combination of 2,6-di-tert.-butyl-4-methylphenol and dilauryl-3,3'-thiodipropionate is demonstrated if plastic grade polyethylene having an average molecular weight greater than 15,000, a density of about .91 and a melt index of 7.59 is substituted for the polypropylene, or if distearyl-3,3'-thiodipropionate is substituted for the dilauryl-3,3'-thiodipropionate. Such alkylated phenols as 2,6-di-(methylbenzyl)-4-methylphenol and 3,6-diisopropylcatechol were also found to form synergistic stabilizer combinations with dilauryl-3,3'-thiodipropionate in the polypropylene. The alkyl phenol, 2,6-di-tert.-butyl-4-methylphenol, while synergizing with the dilauryl ester of 3,3'-thiodipropionic acid, was found not to synergize in polypropylene with this acid in unesterified form.

A minor proportionate amount of unesterified 3,3'-thiodipropionic acid can be added to the subject poly-α-olefin compositions to minimize color formation imparted by certain phenols. Usually about .005% to 3%, and preferably about .01% to 1% by weight based on the poly-α-olefin of 3,3'-thiodipropionic acid is utilized.

The present invention thus provides novel poly-α-olefin compositions having improved stability against deterioration resulting from exposure to elevated temperatures, and particularly, it provides novel synergistic stabilizer combinations for poly-α-olefin compositions.

Although the invention has been described in detail with reference to preferred embodiments thereof, it will be understood that variations and modifications can be effected within the spirit and scope of the invention as described hereinabove and as defined by the appended claims.

I claim:
1. A polyolefin composition comprising
   (A) a poly-α-olefin derived from α-monoolefinic aliphatic hydrocarbons having 2 to 10 carbon atoms, and
   (B) a stabilizing amount of a stabilizer combination comprising

(1) a diester of 3,3'-thiodipropionic acid having the formula $$S(CH_2CH_2COOR)_2$$

wherein R is an alkyl radical having 4 to 20 carbon atoms, and
(2) a substituted phenol having the following formula

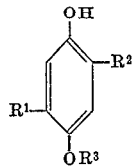

wherein $R^1$ and $R^2$ are selected from the group consisting of hydrogen and tertiary alkyl radicals having 4 to 8 carbon atoms, at least one of $R^1$ and $R^2$ being a tertiary alkyl radical; and $R^3$ is an alkyl radical having 1 to 12 carbon atoms.

2. A polyolefin composition according to claim 1 wherein said poly-α-olefin is polyethylene or polypropylene.

3. A polyolefin composition according to claim 1 wherein said substituted phenol is a mixture of 2-tert-butyl-4-methoxyphenol and 3-tert-butyl-4-methoxyphenol.

References Cited
UNITED STATES PATENTS

| | | | |
|---|---|---|---|
| 2,956,982 | 10/1960 | McCall et al. | 260—45.85 |
| 2,983,710 | 5/1961 | Tholstrup et al. | 260—45.95 |

FOREIGN PATENTS

| | | |
|---|---|---|
| 587,296 | 4/1960 | Belgium. |
| 929,435 | 6/1963 | Great Britain. |

HOSEA E. TAYLOR, JR., Primary Examiner

U.S. Cl. X.R.

260—45.95; 117—128.4, 132, 124, 155